United States Patent
Mace et al.

(10) Patent No.: US 12,331,255 B2
(45) Date of Patent: Jun. 17, 2025

(54) OIL DEMETALLATION AND DE-ASHING PROCESSING BY NEUTRALIZATION AND CENTRIFUGING OF FLOCCULATED HEAVY ASPHALTENE HYDROCARBON CONTENT

(71) Applicant: Tradebe Environmental Services, LLC, Merrillville, IN (US)

(72) Inventors: Mitch Mace, Saraland, AL (US); Ted Longsdorf, Saraland, AL (US); Alex Ortells, Saraland, AL (US); Kenny Huy, Saraland, AL (US)

(73) Assignee: Tradebe Environmental Services, LLC, Merrillville, IN (US)

( * ) Notice: Subject to any disclaimer, the term of this patent is extended or adjusted under 35 U.S.C. 154(b) by 202 days.

(21) Appl. No.: 18/331,377

(22) Filed: Jun. 8, 2023

(65) Prior Publication Data
US 2023/0399574 A1    Dec. 14, 2023

Related U.S. Application Data

(60) Provisional application No. 63/351,547, filed on Jun. 13, 2022.

(51) Int. Cl.
*C10G 53/10* (2006.01)
*B01D 17/02* (2006.01)
(Continued)

(52) U.S. Cl.
CPC ......... *C10G 53/10* (2013.01); *B01D 17/0214* (2013.01); *B01D 17/0217* (2013.01);
(Continued)

(58) Field of Classification Search
CPC .............. C10G 53/10; C10G 2300/205; C10G 2300/206; C10G 2400/06; B01D 17/0214;
(Continued)

(56) References Cited

PUBLICATIONS

Tarrer et al, Methods for Demetallation of Waste Oil (copy provided by Applicant) (Year: 1993).*

(Continued)

*Primary Examiner* — Randy Boyer
*Assistant Examiner* — Juan C Valencia
(74) *Attorney, Agent, or Firm* — Day Pitney LLP; George Chaclas; Anthony A. Kassas

(57) ABSTRACT

A method to demetal and de-ash oil feedstock. The method includes adding direct steam and sulfuric acid to oil feedstock to form acid treated oil, the sulfuric acid to strip the oil feedstock of metals, adding de-emulsifier to the acid treated oil feedstock to aid in phase separation, and settling the acid treated oil feedstock to separate into clarified oil, water, and a rag layer. The method includes centrifuging the clarified oil with a centrifuge running in a 3 phase configuration to remove water and solids from the clarified oil, and ensuring proper temperature and adding triethanol amine (TEA) to the centrifuged clarified oil to flocculate asphaltenes in the centrifuged clarified oil, creating TEA treated oil. The method includes centrifuging the TEA treated oil with a centrifuge running in a 2 phase configuration to remove the asphaltenes from the TEA treated oil and create marine fuel.

18 Claims, 3 Drawing Sheets

(51) Int. Cl.
  *B01D 17/04* (2006.01)
  *B01D 21/01* (2006.01)
  *B01D 21/26* (2006.01)

(52) U.S. Cl.
  CPC ........... *B01D 17/047* (2013.01); *B01D 21/01* (2013.01); *B01D 21/262* (2013.01); *C10G 2300/205* (2013.01); *C10G 2300/206* (2013.01); *C10G 2400/06* (2013.01)

(58) Field of Classification Search
  CPC .. B01D 17/0217; B01D 17/047; B01D 21/01; B01D 21/262
  See application file for complete search history.

(56) References Cited

PUBLICATIONS

Tarrer, Dr. A.R. et al., "Methods For Demetallation Of Waste Oil", Auburn University Chemical Engineering Department, EPA/600/R-92/000, Mar. 1993, 156 pages.

\* cited by examiner

OIL DEMETALLATION AND DE-ASHING PROCESSING BY NEUTRALIZATION AND CENTRIFUGING OF FLOCCULATED HEAVY ASPHALTENE HYDROCARBON CONTENT

CROSS-REFERENCE TO RELATED APPLICATIONS

The application claims the benefit of U.S. Provisional Application No. 63/351,547 filed on Jun. 13, 2022, the entire disclosure of which is incorporated herein by reference for all purposes.

FIELD OF THE DISCLOSURE

The subject disclosure relates to oil demetallation, and more particularly to oil demetallation neutralization and centrifuging of flocculated heavy asphaltene hydrocarbon content.

BACKGROUND

The shipping industry is responsible for a significant amount of global greenhouse gas emissions and other forms of air pollution. The combustion of marine fuel, also known as bunker fuel, is one of the major sources of these emissions. The high sulfur content in bunker fuel is a significant contributor to air pollution and other environmental issues. The International Maritime Organization (IMO) established the International Convention for the Prevention of Pollution from Ships (MARPOL) in 1973 to regulate air pollution from ships. In 2020, the global limit on sulfur content in marine fuel was reduced to 0.5% by weight.

Annex VI of MARPOL sets the global limit on sulfur content in marine fuel. Before 2020, the global limit was 3.5% sulfur content by weight. This reduction was a significant step towards reducing air pollution and improving air quality, particularly in coastal areas and port cities. Maritime vessels were given three options to meet the new rule while operating in global waters outside of emission control areas: operate on 0.5% sulfur content as a maximum; operate on liquefied natural gas, liquefied ethane, methanol or liquefied petroleum gas; or operate on high sulfur heavy fuel oil with an approved emissions scrubbing unit to reduce sulfur oxide to an equivalent measure.

Most maritime operators were expected to operate on very low sulfur fuel oil (VLSFO). VLSFO is a type of marine fuel that has a sulfur content of 0.5% or less by weight. It is produced by blending different grades of crude oil and adding refinery streams such as vacuum gas oil and coker gas oil. VLSFO is a cleaner and less polluting fuel than traditional bunker fuel.

There was a question of readiness within the industry to comply with the new rule. Indeed, the production of VLSFO is not without challenges. One of the main challenges is the limited availability of VLSFO in some parts of the world. This is because not all refineries are capable of producing VLSFO, and those that can produce it may not have the capacity to meet the growing demand. As a result, the price of VLSFO is higher than that of traditional bunker fuel.

One solution in meeting the standards imposed by MARPOL was to use alternative fuels, such as liquefied natural gas (LNG), biofuels, and hydrogen. These fuels have lower sulfur content and produce fewer emissions than traditional bunker fuel. However, their availability is limited, and they require significant investment in infrastructure and technology to produce and distribute.

Another solution was to install exhaust gas cleaning systems, also known as scrubbers. The installation of scrubbers on ships allows them to continue using traditional bunker fuel with a high sulfur content while reducing their emissions. The scrubber works by removing sulfur dioxide from the exhaust gas before it is released into the atmosphere. The scrubber can either be installed as an open-loop system, where seawater is used to wash the exhaust gas, or a closed-loop system, where a chemical solution is used to neutralize the sulfur dioxide. However, the installation of scrubbers is not a universal solution. The cost of installing scrubbers can be significant, and it requires significant downtime for the ship. Additionally, there are concerns about the environmental impact of the discharge of the washwater used in open-loop scrubbers. Some ports have also banned the use of open-loop scrubbers, further limiting their use.

The Applicant of the subject disclosure undertook a developmental project to convert used motor oil into VLSFO for the marine industry. This included the production of marine fuel in accordance with ISO 8217 specifications. The specifications cover a range of characteristics, including density, viscosity, flashpoint, and sulfur content. The specifications also set limits on contaminants such as water, sediment, and ash content.

Thus, for economic and technical reasons, operating with a fuel that complies with the ISO 8217 specifications and compatible with current equipment is desired. Viscosity, pour point, ash content, acidity, and cat fines are among important considerations. Below is a partial list of parameters and specifications that must be met to comply with the ISO 8217 specifications:

| | |
|---|---|
| Accelerated Total Sediment % (m/m) | 0.1 |
| TAN (mg KOH/g) | 2.5 |
| Pour Point (degrees C.) | 30 |
| Average Ash % (m/m) | 0.1 |
| Al ppm | 60 (Al + Si) |
| Si ppm | 60 (Al + Si) |
| Na ppm | 100 |
| V ppm | 350 |
| Ca* ppm | 30 |
| Zn* ppm | 15 |
| P* ppm | 15 |
| Water % | 0.5 |
| Sulfur % | 0.5 |

*Can be met by Ca < 30 and Zn < 15 or Ca < 30 and P < 15

Used motor oil is a renewable resource as long as internal combustion engines are in use. In addition, recycling through conversion into a bunker fuel is a one for one replacement for virgin fuel oil production. This has obvious environmental and supply chain benefits.

Motor oil, new and used, inherently has low sulfur so in this regard it is an ideal candidate for conversion into a bunker fuel to meet the 0.5% sulfur standard. Refining motor oil is a complex process that involves removing contaminants such as calcium, zinc, asphaltenes, and acidity. These contaminants can have a significant impact on the performance and longevity of the engine. Calcium and zinc are often added to motor oil as anti-wear additives, but they can also cause problems by forming deposits on engine parts. Asphaltenes are a natural component of crude oil that can form sludge and cause engine damage. Acidity in motor oil can lead to corrosion and engine wear.

In order to take advantage of recycling used motor oil into bunker fuel, the Applicant of the subject disclosure developed a physical-chemical process to remove or reduce the contaminants to within the ISO 8217 specifications. Below is a sample of the specifications achieved with the Applicant's demetallation and de-ashing process:

| | |
|---|---|
| Accelerated Total Sediment % (m/m) | 0.02 |
| TAN (mg KOH/g) | 1.25 |
| Pour Point (degrees C.) | −48 |
| Average Ash % (m/m) | 0.059 |
| Average Carbon Residue % (m/m) | 0.21 |
| Al ppm | <5 |
| Si ppm | 18 |
| Na ppm | 39 |
| V ppm | <1 |
| Ca ppm | 12 |
| Zn ppm | 13 |
| P ppm | 6 |
| Water % | 0.3 |
| Sulfur % | 0.3 |

SUMMARY

The subject technology is directed to a method to demetal and de-ash oil feedstock into marine fuel. The method includes the steps of adding sulfuric acid to oil feedstock to form acid treated oil, the sulfuric acid to strip the oil feedstock of metals, and adding de-emulsifier to the acid treated oil feedstock to aid in phase separation. The method further includes the steps of settling the acid treated oil feedstock to separate into clarified oil, water, and a rag layer, and thereafter centrifuging the clarified oil with a centrifuge running in a 3 phase configuration to remove water and solids from the clarified oil. The method further includes the steps of adding triethanol amine (TEA) to the centrifuged clarified oil to flocculate asphaltenes in the centrifuged clarified oil, creating TEA treated oil, and centrifuging the TEA treated oil with a centrifuge running in a 2 phase configuration to remove the asphaltenes from the TEA treated oil to create marine fuel.

The oil feedstock may have a flash point greater than 140 degrees Fahrenheit, a water content by volume of less than 5%, and a silicon content of less than 60 ppm.

In another implementation, adding sulfuric acid to the oil feedstock may include adding 1% sulfuric acid by volume to the oil feedstock. Yet still, the method may further include the steps of circulating and heating the acid treated oil feedstock to a set point of 160-170 degrees Fahrenheit prior to settling the acid treated oil feedstock, or circulating the oil feedstock prior to adding sulfuric acid thereto, or circulating and heating the acid treated oil to at 120 degrees Fahrenheit prior to adding the de-emulsifier.

In yet another implementation, the method may further include the steps of heating the clarified oil to 160-170 degrees Fahrenheit prior to centrifuging the clarified oil with the centrifuge running in 3 phase configuration to aid in phase separation, settling the centrifuged clarified oil prior to adding TEA to the centrifuged clarified oil, or circulating and heating the centrifuged clarified oil to 120 degrees Fahrenheit prior to adding TEA to the centrifuged clarified oil. The method may further include the step of settling the marine fuel after centrifuging the TEA treated oil with the centrifuge running in 2 phase configuration.

Adding de-emulsifier to the acid treated oil may include adding 0.5% de-emulsifier by volume. Centrifuging the clarified oil with a centrifuge running in 3 phase configuration may include centrifuging until the water content is less than 0.3% by volume. Adding TEA to the centrifuged clarified oil includes adding 1% TEA by volume to the centrifuged clarified oil.

The subject technology is directed to a method to demetal and de-ash acid treated oil into marine fuel. The method includes the steps of circulating and heating acid treated oil to 160-170 degrees Fahrenheit to aid in phase separation in a reactor, and centrifuging the acid treated oil with a centrifuge running in 3 phase configuration to remove water and solids from the acid treated oil until the water content is less than 0.3% by volume. The method includes the steps of settling the acid treated oil, circulating and heating the acid treated oil to 120 degrees Fahrenheit, and adding 1% triethanol amine (TEA) by volume to the acid treated oil to create TEA treated oil, the TEA to flocculate asphaltenes in the acid treated oil. The method includes the steps of centrifuging the TEA treated oil with a centrifuge running in 2 phase configuration to remove the asphaltenes from the TEA treated oil, and settling the TEA treated oil to create marine fuel.

The acid treated oil may include less than 0.5% water by volume, less than 30 ppm of Calcium and Zinc, and less than 60 ppm of Zinc.

In another implementation, centrifuging the acid treated oil with a centrifuge running in 3 phase configuration may include centrifuging at 15-20 gallons per minute in a circulatory pattern with the reactor. Centrifuging the TEA treated oil with a centrifuge running in 2 phase configuration may include centrifuging at 15-20 gallons per minute in a circulatory pattern with the reactor.

The subject technology is directed to a method for processing marine fuel. The method includes the step of circulating and heating clarified oil to 160-170 degrees Fahrenheit in a reactor to aid in phase separation, the clarified oil including less than 0.5% water by volume, less than 30 ppm of Calcium and Zinc, and less than 60 ppm of Zinc. The method includes the steps of centrifuging the clarified oil with a centrifuge running in 3 phase configuration at 15-20 gallons per minute in a circulatory pattern with the reactor to remove water and solids from the clarified oil until the water content is less than 0.3% by volume, and settling the clarified oil. Yet still, the method includes the steps of circulating and heating the clarified oil to 120 degrees Fahrenheit, and adding 1% triethanol amine (TEA) by volume to the clarified oil to create TEA treated oil, the TEA to flocculate asphaltenes in the clarified oil. Lastly, the method includes the steps of centrifuging the TEA treated oil with a centrifuge running in 2 phase configuration centrifuging at 15-20 gallons per minute in a circulatory pattern with the reactor to remove the asphaltenes from the TEA treated oil, and settling the TEA treated oil to create marine fuel.

BRIEF DESCRIPTION OF THE APPENDICES

Various aspects of the present disclosure are discussed herein with reference to the accompanying Figures. It will be appreciated that for simplicity and clarity of illustration, elements shown in some of the Figures have not necessarily been drawn accurately or to scale. For example, the dimensions of some of the elements can be exaggerated relative to other elements for clarity or several physical components can be included in one functional block or element. The Figures are provided for the purposes of illustration and explanation and are not intended as a definition of the limits of the disclosure.

DETAILED DESCRIPTION

Figure 1:
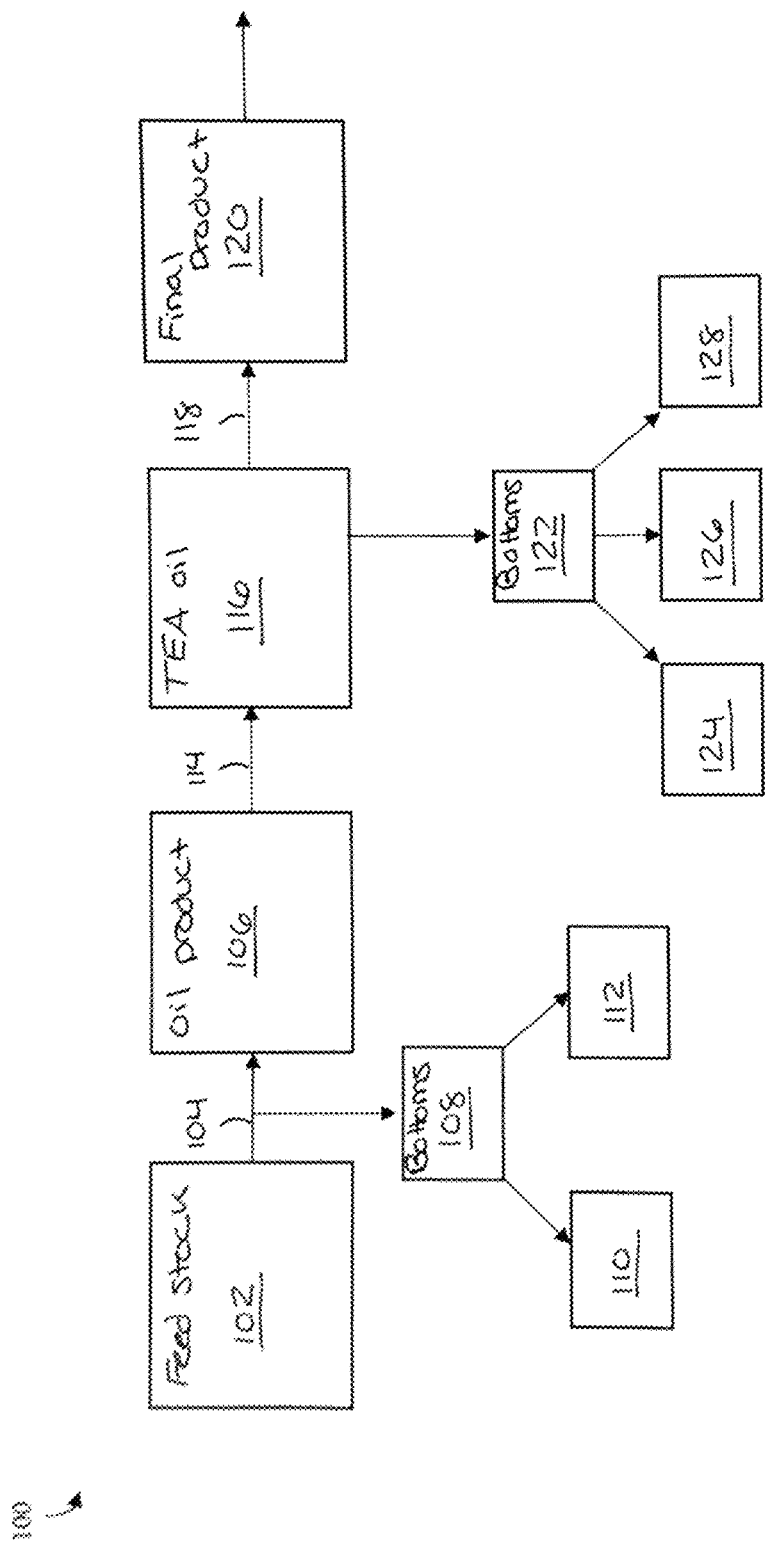
FIG. 1 is a process diagram detailing the conversion of oil feedstock to ISO 8217 compliant marine fuel.

The subject technology overcomes many of the prior art problems associated with processing marine fuel. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, there is shown a process diagram 100 detailing a general scheme for the conversion of oil feedstock 102 to ISO 8217 compliant marine fuel. The process diagram 100 initiates through acidulation 104 of the oil feedstock. In this regard, oil feedstock 102 is circulated and heated. Once the temperature of the oil feedstock 102 reaches about 140 degrees Fahrenheit, CT-101 de-emulsifier is added to the oil feedstock 102. The contents of acid, water, CT-101 de-emulsifier, and oil feedstock is heated to 160-170 degrees Fahrenheit and allowed to react for 30 minutes once the operative temperature is reached.

The acidulation 104 of the oil feedstock continues by enabling the mixture to settle for 9-12 hours. The oil product 106 is removed, and thereafter, the bottoms 108 of the reaction, consisting of acid, water, and sludge, is neutralized. Of the bottoms 108, acid and water is removed to a de-watering box for waste water treatment 110. This treatment process typically involves a combination of physical and chemical processes that are designed to remove a wide range of contaminants from the wastewater, including inorganic compounds and suspended solids. The specific treatment processes used will depend on the composition and volume of the wastewater, as well as the discharge or reuse requirements. The sludge portion of the bottom 108 is allowed to solidify 112.

Referring back to the oil product 106, the process continues by treating the oil product 106 through a series of steps 114. Firstly, the oil product 106 is heated to 120 degrees Fahrenheit. Triethanol amine (TEA) is thereafter added to the oil product when the temperature of the oil product reaches 120 degrees Fahrenheit and is allowed to react for 30 minutes. The TEA treated oil 116 is settled for two days. The TEA oil 116 is decanted and diverted 118 to a final product tank 120, while the TEA treated oil bottoms 122 is processed to a holding tank for gravity settling 124, tri-canting 126, and/or centrifuging 128.

Figure 2:
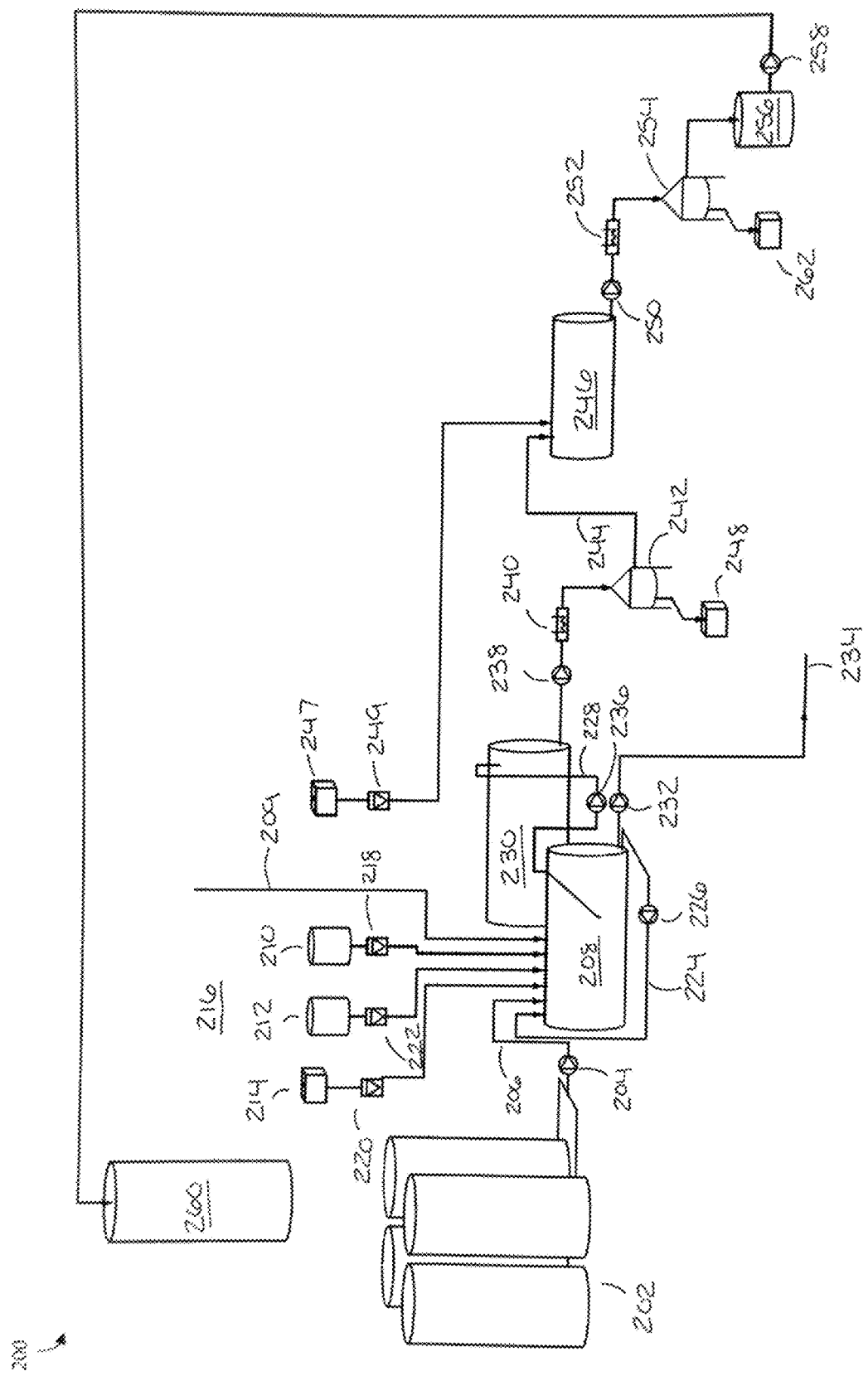
FIG. 2 is flow chart detailing a method to demetal and de-ash oil feedstock into ISO 8217 compliant marine fuel.

Referring now to FIG. 2, a piping and instrumentation diagram 200 is shown, detailing the conversion of oil feedstock to ISO 8217 compliant marine fuel. Initially, oil feedstock is held in a 150,000 gallon tank farm 202. The tank farm 202 may be designed to meet industry standards and regulations, while procuring a configuration for processing marine fuel. One type of tank that can be used for the initial oil feedstock is a double-walled steel tank. Double-walled steel tanks consist of an outer and inner steel shell with insulation there between to prevent leaks and spills.

Another option for storing the initial oil feedstock in tank farm 202 is one or more fiberglass reinforced plastic (FRP) tanks. These tanks are highly resistant to corrosion and chemicals, making them ideal for storing oil feedstock which can be highly corrosive. FRP tanks are also lightweight and easy to install, which reduces the time and cost of installation.

Tanks in the tank farm 202 may be arranged in various configurations, such as a cluster configuration or a linear configuration. A cluster configuration involves placing several tanks close to each other, creating a centralized storage area. A linear configuration involves placing tanks in a straight line, which can be beneficial for facilities with limited space. Aside from the physical tanks, tank farm 202 may further include leak detection systems, fire suppression systems, and emergency shut-off valves.

The oil feedstock in tank farm 202 is then pumped via a centrifugal pump, gear pump, and/or a positive displacement pump 204 through a piping network 206 to a 25,400 gallon reactor 208. The type of pump 204 and piping 206 used for transferring the oil feedstock from tank farm 202 to reactor 208, or any pump or piping discussed herein, depends on the type of oil being transferred, the distance between the tank farm 202 and the reactor 208, and the required flow rate.

Reactor 208 is an AST UL-142 tank with direct steam injection 209. UL-142 tanks are steel atmospheric tanks intended for aboveground storage of non-corrosive, stable, flammable, and combustible liquids. UL-142 tanks are built to Underwriters Laboratories specification standard UL-142.

The piping and instrumentation diagram 200 further details three reagent tanks 210, 212, 214 situated in a reactive area 216. Reagent tank one 210 is a custom stainless steel 500 gallon reagent tank, storing 93% sulfuric acid ($SO_4H_2$) by volume. Reagent tank 212 is an ASTM D01998 double wall high density polyethylene 2,500 gallon tank, storing 20% sodium hydroxide (NaOH) by volume. Reagent tank three 214 is a 275 galloon intermediate bulk container tote, storing CT 101 de-emulsifier. CT 101 de-emulsifier is typically a blend of chemical compounds that act on the surface of an emulsion, reducing the interfacial tension between the water and oil phases. This reduces the stability of the emulsion and promotes the coalescence and separation of the water droplets from the oil phase.

The conversion of oil feedstock to ISO 8217 compliant marine fuel continues with the pumping of the 93% sulfuric acid by volume from reagent tank one 210 to reactor 208, via a pump 218, at a volume of 1% relative to the oil feedstock in regent tank one 208. Reactor 208 is then heated to 120 degrees Fahrenheit, and subsequently, CT 101 de-emulsifier is pumped 220 into reactor 208 at 0.5% by volume to aid in phase separation.

Reactor 208 is then brought to 160-170 degrees Fahrenheit and circulated via recirculation piping 224 and pump 226 for 30 minutes to complete the reaction and aid in phase separation. Reactor 208 and the mixture therein is allowed to gravity settle thereafter for 15 hours to complete separation of clarified oil, rag layer, and water. Clarified oil is defined, for purposes herein, as <0.5% water (water by distillation) by volume, Ca and Zn content each at <30 ppm, and Si content at <60 ppm (X-ray fluorescence).

Utilizing sample ports (not distinctly shown) in reactor 208, the oil and water break line is located, and, with a swing line 228, clarified oil is transferred to reactor 230 via the force of a pump 236. The remaining water and sludge in reactor 208 is neutralized with a solution of sodium hydroxide from reagent tank 212 and afterward is pumped 232 or ejected out for waste water treatment and solidification 234.

The swing line 228 is a piping arrangement that allows for the removal of reactor internals, such as clarified oil, without the need for a complete shutdown of the reactors 208, 230. The swing line 228 is typically connected to the reactors 208, 230 through a flange or other connection, and it can be rotated or pivoted away from the reactors 208, 230 to allow access to the internals of the reactor 208, 230. By providing access to the internals without the need for a shutdown, swing line 228 can help minimize downtime and improve the overall efficiency of the reactor. The line 228 may be equipped with valves or other control devices to ensure safe and proper operation.

Reactor 230 is also an AST UL-142 tank. Upon receipt of the clarified oil, the contents of reactor 230 are circulated (not distinctly shown) and heated to 160-170 degrees Fahrenheit to aid in phase separation during centrifugation. The clarified oil in reactor 230 is thereafter pumped 238 and optionally heated by a heat exchanger 240 to 160 degrees Fahrenheit, prior to being processed through a vertical centrifuge 242.

The centrifuge 242 is an Alfa Laval WHPX 513 Centrifuge, a self-cleaning disc-stack centrifuge built for the three-phase separation of mixed fluids and sludge. The centrifuge 242 is ran at 15-20 gallons per minute in a recirculatory pattern with reactor 230 until the water content of the clarified oil is less than <0.3% by volume.

Thereafter, the centrifuged clarified oil is discharged 244 by the centrifuge 242 to a 20,000 gallon double wall holding tank 246 until reactor 230 is empty. The water and sludge content byproducts 248 of centrifuge 242 are extracted therefrom and processed via waste water treatment. The content of the centrifuged clarified oil in the holding tank 246 is checked periodically, such as every hour, to confirm that the water content thereof remains at less than <0.3% by volume. The centrifuged clarified oil is allowed to settle in the holding tank 246 for 4 hours. 300 gallons of the oil is siphoned off from holding tank 246 and checked to confirm the water content remains <0.3% by volume.

The remaining centrifuged clarified oil is processed in a circulatory pattern back to reactor 230 and heated to 120 degrees Fahrenheit under circulation. 1% triethanol amine (TEA) 247 by volume is pumped 249 into reactor 246 and permitted to react for 30 minutes. The TEA flocculates asphaltenes in the clarified oil. Asphaltenes are heavy, high-molecular-weight hydrocarbons that are naturally present in the oil and can cause various issues in oil production and refining processes. The TEA works by forming strong hydrogen bonds with the polar functional groups present in asphaltenes, such as carboxyl and sulfonic acid groups. These interactions cause the asphaltenes to aggregate and form larger particles or flocs, which can be more easily separated from the oil. The flocculation process can be further enhanced by adjusting the pH of the oil. TEA is most effective at slightly basic pH levels (pH 8-9), where the asphaltenes are more negatively charged and more susceptible to flocculation.

The asphaltene and oil mixture is then pumped 250, and optionally heated via a heat exchanger 252, through to a second centrifuge 254. The second centrifuge is also an Alfa Laval WHPX 513 Centrifuge, though built for two-phase separation. The mixture is processed through the centrifuge 254 at 15-20 gallons per minute in a two-phase configuration to remove the asphaltenes from the oil. The oil is then processed in a circulatory pattern back to reactor 246 to confirm the water content remains <0.3% by volume. The oil is discharged from the centrifuge to a holding tank 256 until the reactor 246 is empty, while checking the water and Ca content every two hours to confirm their content are ISO 8217 compliant. The contents of holding tank 256 are allowed to settle for four hours. 300 gallons of the contents of holding tank 256 are removed from the bottom to ensure residual asphaltenes are eliminated therefrom, while ensuring the water and Ca content are ISO 8217 compliant.

The contents of holding tank 256 are thereafter pumped 258 to a final product tank 260 from which a representative sample is siphoned for internal and independent lab analysis and testing for ISO 8217 compliance. The water and sludge content byproducts 262 of centrifuge 254 are extracted therefrom and processed via waste water treatment.

Figure 3:
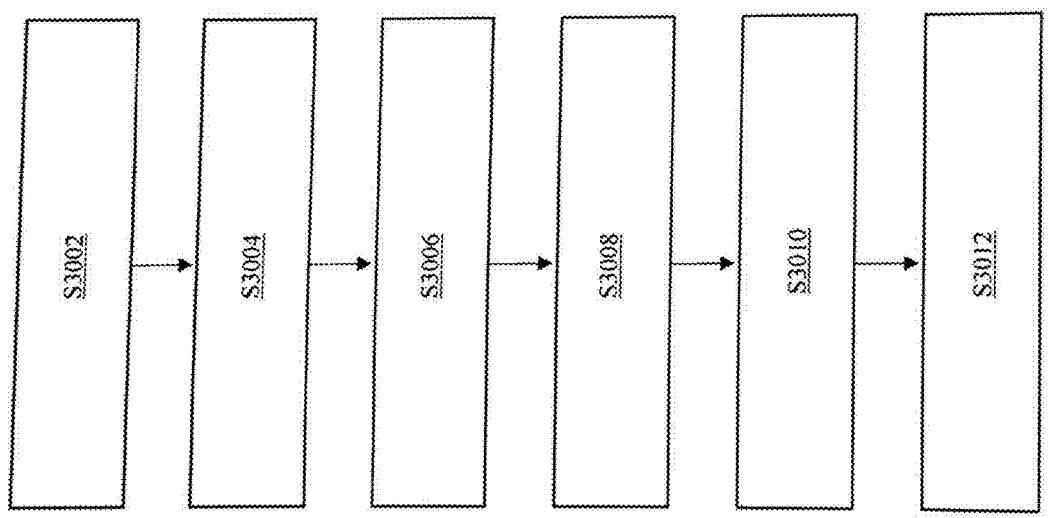
FIG. 3 is a piping and instrumentation diagram detailing the conversion of oil feedstock to ISO 8217 compliant marine fuel.

FIG. 3 shows a flow chart detailing a method to demetal and de-ash oil feedstock into ISO 8217 compliant marine fuel. The method commences at S3002 by adding sulfuric acid to oil feedstock to form acid treated oil. The sulfuric acid strips the oil feedstock of metals. At S3004, a de-emulsifier is added to the acid treated oil feedstock to aid in phase separation. Next, the acid treated oil feedstock is settled S3006 to separate the acid treated oil feedstock into clarified oil, water, and a rag layer. The clarified oil is then centrifuged S3008 with a centrifuge running in a 3 phase configuration to remove water and solids from the clarified oil. Once centrifuged, the centrifuged clarified oil is treated S3010 by adding triethanol amine (TEA) thereto to flocculate asphaltenes in the centrifuged clarified oil, creating TEA treated oil. Lastly, the TEA treated oil is centrifuged S3012 with a centrifuge running in a 2 phase configuration to remove the asphaltenes from the TEA treated oil to create marine fuel.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A method to demetal and de-ash oil feedstock into marine fuel, the method comprising the steps of:
   adding sulfuric acid to oil feedstock to form acid treated oil, the sulfuric acid to strip the oil feedstock of metals;
   adding de-emulsifier to the acid treated oil feedstock to aid in phase separation;
   settling the acid treated oil feedstock to separate into clarified oil, water, and a rag layer;
   centrifuging the clarified oil with a centrifuge running in a 3 phase configuration to remove water and solids from the clarified oil;
   adding triethanol amine (TEA) to the centrifuged clarified oil to flocculate asphaltenes in the centrifuged clarified oil, creating TEA treated oil; and
   centrifuging the TEA treated oil with a centrifuge running in a 2 phase configuration to remove the asphaltenes from the TEA treated oil to create marine fuel.

2. The method of claim 1, wherein the oil feedstock has the following parameters:
   a flash point greater than 140 degrees Fahrenheit;
   a water content by volume of less than 5%; and
   a silicon content of less than 60 ppm.

3. The method of claim 1, wherein adding sulfuric acid to the oil feedstock includes adding 1% sulfuric acid by volume to the oil feedstock.

4. The method of claim 1, further comprising the steps of circulating and heating the acid treated oil feedstock to a set point of 160-170 degrees Fahrenheit prior to settling the acid treated oil feedstock.

5. The method of claim 1, further comprising the step of circulating the oil feedstock prior to adding sulfuric acid thereto.

6. The method of claim 1, further comprising the step of circulating and heating the acid treated oil to at 140 degrees Fahrenheit prior to adding the de-emulsifier.

7. The method of claim 1, wherein adding de-emulsifier to the acid treated oil includes adding 0.5% de-emulsifier by volume.

8. The method of claim 1, further comprising the step of heating the clarified oil to 160-170 degrees Fahrenheit prior to centrifuging the clarified oil with the centrifuge running in 3 phase configuration to aid in phase separation.

9. The method of claim 1, wherein centrifuging the clarified oil with a centrifuge running in 3 phase configuration includes centrifuging until the water content is less than 0.3% by volume.

10. The method of claim 1, further comprising the step of settling the centrifuged clarified oil prior to adding TEA to the centrifuged clarified oil.

11. The method of claim 1, further comprising the step of circulating and heating the centrifuged clarified oil to 120 degrees Fahrenheit prior to adding TFA to the centrifuged clarified oil.

12. The method of claim 1, wherein adding TEA to the centrifuged clarified oil includes adding 1% TEA by volume to the centrifuged clarified oil.

13. The method of claim 1, further comprising the step of settling the marine fuel after centrifuging the TEA treated oil with the centrifuge running in 2 phase configuration.

14. The method of claim 13, wherein the acid treated oil includes:
    less than 0.5% water by volume;
    less than 30 ppm of Calcium and Zinc; and
    less than 60 ppm of Zinc.

15. The method of claim 13, wherein centrifuging the acid treated oil with a centrifuge running in 3 phase configuration includes centrifuging at 15-20 gallons per minute in a circulatory pattern with the reactor.

16. The method of claim 13, wherein centrifuging the TEA treated oil with a centrifuge running in 2 phase configuration includes centrifuging at 15-20 gallons per minute in a circulatory pattern with the reactor.

17. A method to demetal and de-ash acid treated oil into marine fuel, the method comprising the steps of:
    circulating and heating acid treated oil to 160-170 degrees Fahrenheit to aid in phase separation in a reactor;
    centrifuging the acid treated oil with a centrifuge running in 3 phase configuration to remove water and solids from the acid treated oil until the water content is less than 0.3% by volume;
    settling the acid treated oil;
    circulating and heating the acid treated oil to 120 degrees Fahrenheit;
    adding 1% triethanol amine (TEA) by volume to the acid treated oil to create TEA treated oil, the TEA to flocculate asphaltenes in the acid treated oil;
    centrifuging the TEA treated oil with a centrifuge running in 2 phase configuration to remove the asphaltenes from the TEA treated oil; and
    settling the TEA treated oil to create marine fuel.

18. A method for processing marine fuel comprising the steps of:
    circulating and heating clarified oil to 160-170 degrees Fahrenheit in a reactor to aid in phase separation, the clarified oil including:
    less than 0.5% water by volume;
    less than 30 ppm of Calcium and Zinc; and
    less than 60 ppm of Zinc;
    centrifuging the clarified oil with a centrifuge running in 3 phase configuration at 15-20 gallons per minute in a circulatory pattern with the reactor to remove water and solids from the clarified oil until the water content is less than 0.3% by volume;
    settling the clarified oil;
    circulating and heating the clarified oil to 120 degrees Fahrenheit;
    adding 1% triethanol amine (TEA) by volume to the clarified oil to create TEA treated oil, the TEA to flocculate asphaltenes in the clarified oil;
    centrifuging the TEA treated oil with a centrifuge running in 2 phase configuration centrifuging at 15-20 gallons per minute in a circulatory pattern with the reactor to remove the asphaltenes from the TEA treated oil; and
    settling the TEA treated oil to create marine fuel.

* * * * *